US010326355B2

(12) United States Patent
Kikuchi et al.

(10) Patent No.: US 10,326,355 B2
(45) Date of Patent: Jun. 18, 2019

(54) POWER CONVERSION DEVICE

(71) Applicant: Mitsubishi Electric Corporation, Chiyoda-ku (JP)

(72) Inventors: Takeshi Kikuchi, Chiyoda-ku (JP); Toshiyuki Fujii, Chiyoda-ku (JP); Kaho Mukunoki, Chiyoda-ku (JP)

(73) Assignee: Mitsubishi Electric Corporation, Chiyoda-ku, (JP)

( * ) Notice: Subject to any disclaimer, the term of this patent is extended or adjusted under 35 U.S.C. 154(b) by 0 days.

(21) Appl. No.: 15/571,716

(22) PCT Filed: Jul. 7, 2016

(86) PCT No.: PCT/JP2016/070076
§ 371 (c)(1),
(2) Date: Nov. 3, 2017

(87) PCT Pub. No.: WO2017/010388
PCT Pub. Date: Jan. 19, 2017

(65) Prior Publication Data
US 2018/0159422 A1 Jun. 7, 2018

(30) Foreign Application Priority Data

Jul. 14, 2015 (JP) .................. 2015-140186

(51) Int. Cl.
*H02M 1/32* (2007.01)
*H02M 7/12* (2006.01)
*H02M 1/084* (2006.01)
*H02M 1/12* (2006.01)
*H02M 7/219* (2006.01)
*H02M 1/42* (2007.01)
(Continued)

(52) U.S. Cl.
CPC ........... *H02M 1/32* (2013.01); *H02M 1/0845* (2013.01); *H02M 1/12* (2013.01); *H02M 7/12* (2013.01);
(Continued)

(58) Field of Classification Search
CPC ..... H02M 1/084; H02M 1/4216; H02M 7/125
(Continued)

(56) References Cited

U.S. PATENT DOCUMENTS 8,547,718 B2 * 10/2013 Katoh .................. H02M 1/088
363/131
2004/0160793 A1 * 8/2004 Miermans ............... H02M 1/36
363/65
(Continued)

OTHER PUBLICATIONS

Office Action dated Dec. 5, 2017 in Japanese Patent Application No. 2017-528635 (with English language translation).
(Continued)

*Primary Examiner* — Gary A Nash
(74) *Attorney, Agent, or Firm* — Oblon, McClelland, Maier & Neustadt, L.L.P.

(57) ABSTRACT

The present invention is provided with a power converter and a control device for controlling the power converter, wherein each of the positive arm and the negative arm is comprised one converter cell or a plurality of converter cells connected in series, each converter cell being comprised: a series unit in which a plurality of switching elements are connected in series to each other; and a DC capacitor connected in parallel to the series unit, and the control device includes a DC voltage command value calculation unit which calculates a voltage command value for outputting, during a DC short circuit fault, AC voltage similar to that in a steady state to the AC terminal of the power converter, and for outputting, to the DC terminal of the power converter, DC voltage that allows the protection relay in the DC line to operate.

22 Claims, 10 Drawing Sheets

(51) Int. Cl.
 *H02M 1/00* (2006.01)
 *H02M 7/483* (2007.01)
(52) U.S. Cl.
 CPC ............ *H02M 7/219* (2013.01); *H02M 1/084* (2013.01); *H02M 1/4216* (2013.01); *H02M 7/125* (2013.01); *H02M 2001/007* (2013.01); *H02M 2001/325* (2013.01); *H02M 2007/4835* (2013.01); *Y02E 60/60* (2013.01)
(58) Field of Classification Search
 USPC .. 363/35, 52–54, 65, 67, 68, 71, 78, 79, 87, 363/89, 127, 129
 See application file for complete search history.

(56) References Cited

U.S. PATENT DOCUMENTS

| | | | | |
|---|---|---|---|---|
| 2011/0235221 | A1* | 9/2011 | Vogeli | H02M 1/32 361/18 |
| 2012/0026767 | A1* | 2/2012 | Inoue | H02M 7/217 363/89 |
| 2013/0088900 | A1* | 4/2013 | Park | H02J 9/062 363/71 |
| 2013/0148392 | A1* | 6/2013 | Inoue | H02M 7/10 363/68 |
| 2013/0208519 | A1* | 8/2013 | Yamamoto | H02M 7/12 363/67 |
| 2013/0258730 | A1* | 10/2013 | Sato | H02M 7/00 363/78 |
| 2013/0308235 | A1 | 11/2013 | Davies et al. | |
| 2014/0002933 | A1* | 1/2014 | Gao | H02M 1/32 361/18 |

OTHER PUBLICATIONS

International Search Report dated Sep. 27, 2016 in PCT/JP2016/070076, filed on Jul. 7, 2016.

* cited by examiner

POWER CONVERSION DEVICE

TECHNICAL FIELD

The present invention relates to a power conversion device including a converter in which phase arms are formed by converter cells each composed of a plurality of switching elements and a DC capacitor, the power conversion device being for performing power conversion between an AC circuit having a plurality of phases and a DC circuit. In particular, the present invention relates to a power conversion device that allows the converter to output a level of current at which a protection relay can operate during a DC line fault.

BACKGROUND ART

In large-capacity power conversion devices, the converter output is high voltage or large current, and therefore, many large-capacity power conversion devices are configured with a plurality of converters multiplexed in series or parallel. It is known that multiplexing converters can not only increase the converter capacity, but also reduce harmonics contained in an output voltage waveform by synthesizing outputs, and as a result, can reduce harmonic current flowing to a grid.

There are various methods for multiplexing a converter: reactor multiplexing, transformer multiplexing, direct multiplexing, etc. In a case of transformer multiplexing, since an AC side is isolated by transformers, there is an advantage that common DC current can be used among the converters. However, there is a disadvantage that, in a case where output voltage is high, the configuration of the multiplexed transformer is complicated and the cost of the transformer increases.

Considering the above, as a power conversion device that is suitable for high-voltage usage and does not require a multiplexed transformer, a multilevel converter is proposed in which outputs of a plurality of converters are connected in cascade. One example of such multilevel converters is a modular multilevel converter.

The modular multilevel converter (hereinafter, referred to as MMC) is composed of arms in each of which a plurality of unit converters called cells (hereinafter, referred to as converter cells) are connected in cascade. Each converter cell includes a plurality of semiconductor switches and a DC capacitor, and through ON/OFF control of the semiconductor switches, outputs both-end voltage and zero voltage of the DC capacitor.

In a case of a three-phase MMC, such an arm is individually formed for each phase, output ends of half the total number of converter cells connected in cascade are used as the AC terminal, both ends of the arms of the respective phases are connected to each other, and their respective terminals are used as the DC terminal. Each phase arm is composed of two arms, i.e., a positive arm and a negative arm. Since each converter cell output of the MMC converter is connected to both sides of the DC terminal and the AC terminal of the MMC converter, each converter cell has a characteristic of outputting both DC current and AC current.

Since the MMC converter is connected to both sides of the DC terminal and the AC terminal, it is necessary to handle a fault that occurs at each terminal. In particular, when a fault has occurred at the DC terminal, power transmission stops until the fault is removed. Thus, the fault needs to be removed immediately. Such a DC line fault includes a DC short circuit fault which is a short circuit between DC lines. In order to suppress fault current that occurs during the fault, a control method has been disclosed in which: an MMC converter including converter cells each formed by semiconductor switching elements in full-bridge configuration is used, and the converter is controlled so as to output voltage against arc voltage that occurs during occurrence of a short circuit (for example, see Patent Document 1).

CITATION LIST

Patent Document

Patent Document 1: US2013/0308235 A1

SUMMARY OF THE INVENTION

Problems to be Solved by the Invention

Conventionally, fault current is suppressed by using an MMC converter including converter cells in full-bridge configuration such that gate blocking is performed or voltage is outputted against arc voltage during occurrence of a high-voltage DC line fault. In the method above, fault current is promptly suppressed by controlling the semiconductor switching elements in the converter cells, and thus, DC terminal output becomes zero in a short time period, and the fault can be removed.

A DC line fault is detected and removed by means of a protection relay on the line. However, there is a problem that operation of the protection relay is slower than operation of semiconductor switching elements. That is, when fault current is suppressed by means of a converter, there is a problem that DC current which serves as information for detecting a fault is blocked before the protection relay operates, and detection and removal of the fault point cannot be performed.

The present invention has been made in order to solve the above problem. An object of the present invention is to obtain a power conversion device that applies a small amount of voltage to a DC terminal of a power converter during a DC short circuit fault, and in which the power converter can output a level of current that allows a protection relay to perform fault determination.

Solution to the Problems

A power conversion device according to the present invention is a power conversion device including:
a power converter connected between an AC line having a plurality of phases and a DC line, the power converter for performing power conversion between AC and DC, wherein a positive arm and a negative arm which correspond to each of the plurality of phases are connected in series, one ends of the plurality of positive arms are connected to each other and connected to the DC line at positive side, and one ends of the plurality of negative arms are connected to each other and connected to the DC line at negative side; and
a control device for controlling the power converter, wherein
each of the plurality of positive arms and the plurality of negative arms which correspond to the plurality of phases is comprised one converter cell or a plurality of converter cells connected in series, each converter cell being comprised: a series unit in which a plurality of switching elements are connected in series to each other; and a DC capacitor connected in parallel to the series unit,
the control device has a voltage command generation unit for generating a first voltage command value for each positive arm, and a second voltage command value for each negative arm, and controls each switching element of the converter cell in the positive arm and the negative arm, and when a DC short circuit fault in the DC line has been detected, the control device causes predetermined DC voltage to be outputted from a DC terminal of the power converter, the DC voltage allowing a protection relay in the DC line to operate.

Effect of the Invention

According to the power conversion device of the present invention, even in a case where a DC short circuit fault has occurred, AC voltage similar to that in a steady state is outputted to the AC end of the power converter, and current that can be outputted by the power converter and that allows a protection relay to perform fault determination is outputted to the DC terminal of the power converter. Accordingly, it becomes possible to detect and remove the fault point by causing the protection relay on the DC line to operate.

DESCRIPTION OF EMBODIMENTS

Embodiment 1

Figure 1:
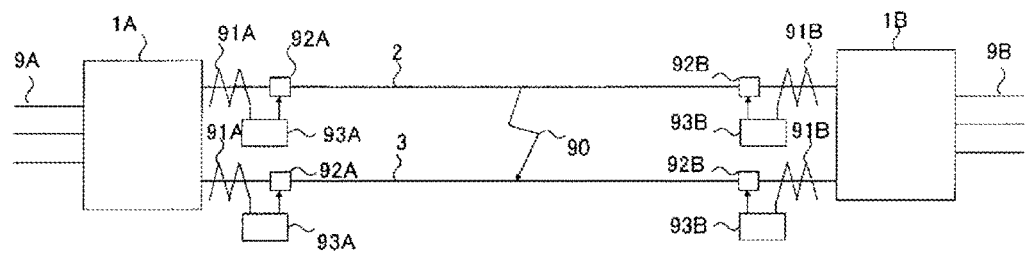
FIG. 1 is a schematic configuration diagram of a two-terminal HVDC system in which a power conversion device according to embodiment 1 of the present invention is used.

Hereinafter, a power conversion device according to embodiment 1 of the present invention is described in detail with reference to FIG. 1 to FIG. 6. FIG. 1 is a schematic configuration diagram of a two-terminal HVDC (High-Voltage DC Transmission) system in which the power conversion device according to embodiment 1 of the present invention is used.

As shown in FIG. 1, power converters 1A, 1B respectively connected to AC grids 9A, 9B have their DC terminals connected to each other by means of DC lines 2, 3, thereby forming a two-terminal HVDC system. In this configuration, the DC line 2, 3 is provided with: sensor groups 91A, 91B; DC breaker groups 92A, 92B; and protection relays 93A, 93B. When a DC short circuit fault 90 has occurred between the DC lines 2, 3, fault current flowing to the DC terminals is detected by the sensor groups 91A, 91B, and the protection relays 93A, 93B perform fault determination to open the DC breaker groups 92A, 92B.

Figure 2:
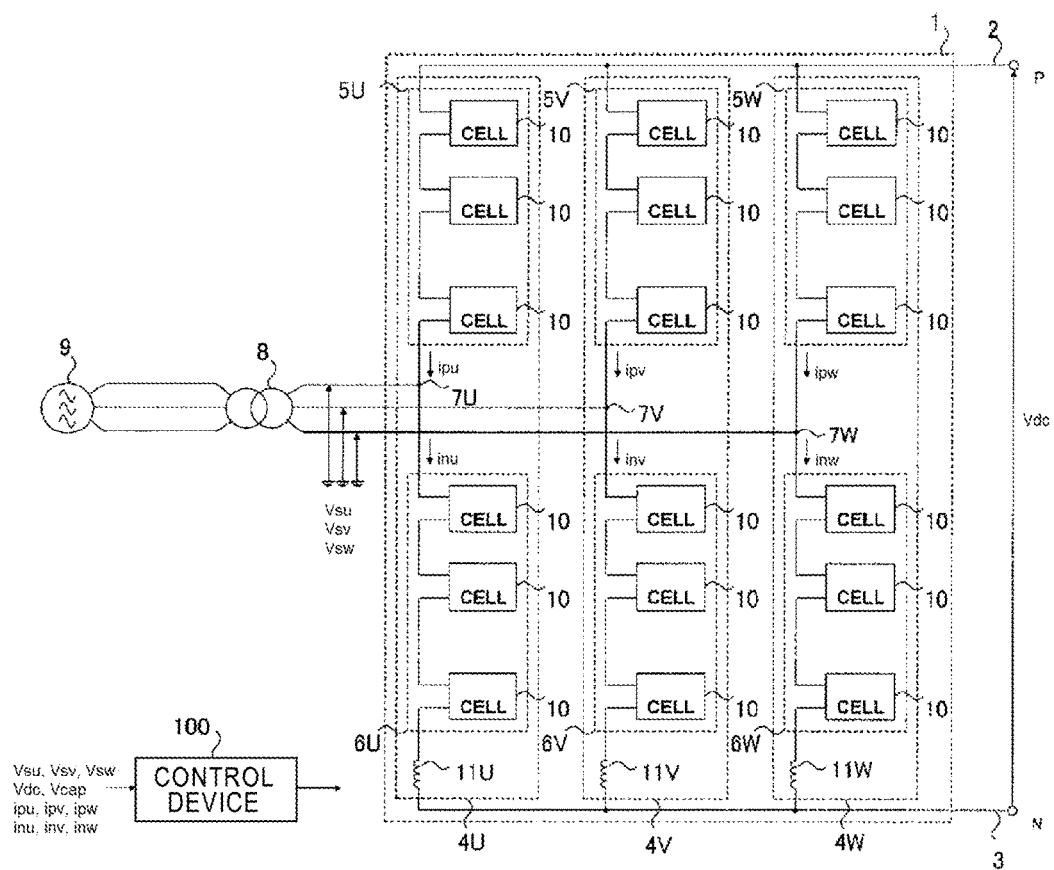
FIG. 2 is a schematic configuration diagram of the power conversion device according to embodiment 1 of the present invention.

FIG. 2 is a schematic configuration diagram of the power conversion device according to embodiment 1 of the present invention. As shown in FIG. 2, the power conversion device includes: a power converter 1 (corresponding to 1A, 1B in FIG. 1) as a main circuit; and a control device 100 for controlling the power converter 1. The power converter 1 performs power conversion between three-phase AC, and DC. The AC side of the power converter 1 is connected via an interconnection transformer 8 to a three-phase AC power supply 9 which is a grid as a three-phase AC circuit, and the DC side of the power converter 1 is connected to the DC grid of the DC lines 2, 3.

Each phase of the power converter 1 is composed of a phase arm 4U, 4V, 4W in which a positive arm 5U, 5V, 5W and a negative arm 6U, 6V, 6W are connected in series, and an AC end 7U, 7V, 7W as the connection point thereof is connected to a corresponding phase AC line. In FIG. 2, the AC ends 7U, 7V, 7W are directly connected to the respective phase AC lines, but may be connected to the respective phase AC lines via a three-winding transformer.

In the three phase arms 4U, 4V, 4W, one ends of the positive arms 5U, 5V, 5W (opposite side to the AC end 7U, 7V, 7W) are connected to each other and connected to the positive DC line 2, and one ends of the negative arms 6U, 6V, 6W are connected to each other and connected to the negative DC line 3, whereby the three phase arms 4U, 4V, 4W are connected in parallel between the positive and negative DC lines 2, 3.

Each of the positive arms 5U, 5V, 5W and the negative arms 6U, 6V, 6W of the phase arms 4U, 4V, 4W is composed of a cell group in which one or a plurality of converter cells 10 are connected in series, and each positive arm and each negative arm are connected in series to a corresponding arm reactor 11U, 11V, 11W.

The position at which the arm reactor 11U, 11V, 11W is inserted may be any position in each arm, and a plurality of arm reactors may be provided separately for positive and negative arms.

The control device 100 includes a voltage command value generation unit and a PWM circuit to generate a gate signal, and controls each converter cell 10 in the positive arm 5U, 5V, 5W and the negative arm 6U, 6V, 6W of each phase. Details of the configuration of the control device 100 will be described with reference to FIG. 5 described later.

Positive arm currents ipu, ipv, ipw and negative arm currents inu, inv, inw respectively flowing in the positive arms 5U, 5V, 5W and the negative arms 6U, 6V, 6W of the respective phases are each detected by a current detector not shown and are inputted to the control device 100. Further, each phase voltage Vsu, Vsv, Vsw of the AC power grid 9, DC bus voltage Vdc, and DC capacitor voltage Vcap (see FIG. 3) are each detected by a voltage detector not shown and are inputted to the control device 100.

AC current Iac and DC current Idc (see FIG. 5) of each phase may be detected by a current detector not shown, or may be calculated from the positive arm current ipu, ipv, ipw and the negative arm current inu, inv, inw flowing in the corresponding positive arm 5U, 5V, 5W and negative arm 6U, 6V, 6W of each phase.

Figure 3:
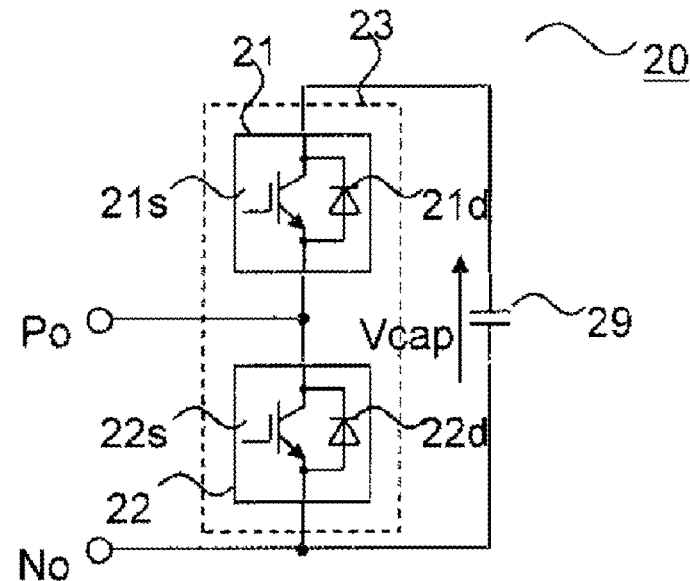
FIG. 3 is a circuit diagram showing a configuration of a converter cell of the power conversion device according to embodiment 1 of the present invention.

A configuration of the converter cell 10 provided in each of the positive arm 5U, 5V, 5W and the negative arm 6U, 6V, 6W is described with reference to FIG. 3. FIG. 3 shows a converter cell 20 employing a half-bridge configuration.

The converter cell 20 shown in FIG. 3 is composed of: a series unit 23 in which a plurality of (two in the case of FIG. 3) switches 21, 22 are connected in series; and a DC capacitor 29 connected in parallel to the series unit 23 and for smoothing DC voltage. Each switch 21, 22 is configured such that a semiconductor switching element 21s, 22s (hereinafter, simply referred to as switching element) is connected in anti-parallel to a diode 21d, 22d.

As the switching element 21s, 22s, a self-turn-off switching element such as IGBT (Insulated Gate Bipolar Transistor) or GCT (Gate Commutated Turn-off thyristor) is used.

As shown in FIG. 3, in the converter cell 20, both terminals of the switching element 22s of the switch 22 are used as output terminals Po, No, and the switching elements 21s, 22s are turned on/off, whereby positive voltage of the DC capacitor 29 and zero voltage are outputted from the output terminals Po, No.

A configuration according to another example of the converter cell 10 is described with reference to FIG. 4.

Figure 4:
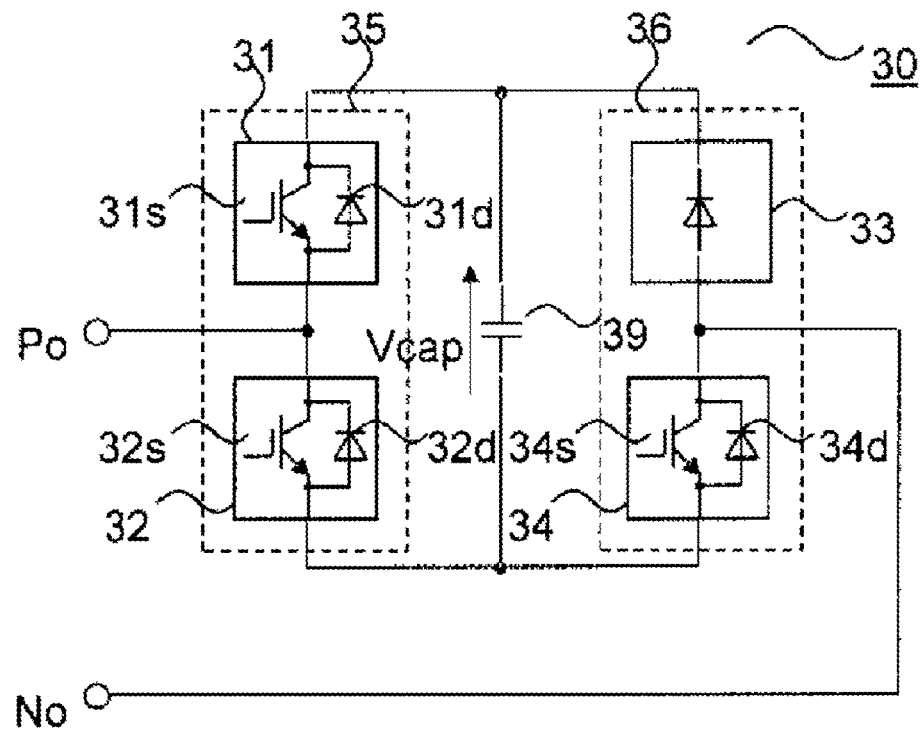
FIG. 4 is a circuit diagram showing a configuration according to another example of the converter cell of the power conversion device according to embodiment 1 of the present invention.

A converter cell 30 shown in FIG. 4 is composed of: two series units 35, 36 connected in parallel; and a DC capacitor 39 connected in parallel to the series units 35, 36 and for smoothing DC voltage. The series unit 35 is composed of a plurality of (two in the case of FIG. 4) switching elements 31s, 32s connected in series, the switching elements 31s, 32s having diodes 31d, 32d connected thereto in anti-parallel. The series unit 36 is composed of a diode 33 and a switching element 34s connected in series, the switching element 34s having a diode 34d connected thereto in anti-parallel. Switches 31, 32, 34 in which the switching elements 31s, 32s, 34s are each implemented by a self-turn-off switching element such as IGBT or GCT and have the diodes 31d, 32d, 34d connected thereto in anti-parallel, are used.

As shown in FIG. 4, in the converter cell 30, the connection point between the switching elements 31s, 32s and the connection point between the diode 33 and the switching element 34s, the connection points respectively serving as intermediate connection points for the series units 35, 36, are used as output terminals Po, No. Then, the switching elements 31s, 32s, 34s are turned on/off, whereby same-polarity positive voltage and opposite-polarity negative voltage, having a magnitude substantially equal to the magnitude of the voltage at both ends of the DC capacitor 39, are outputted from the output terminals Po, No. In addition, zero voltage in a state where the output terminals Po, No are short-circuited by the switching elements is outputted. Hereinafter, the converter cell 30 shown in FIG. 4 is referred to as a converter cell in 1.5 bridge configuration.

As long as the converter cell 20, 30 includes: the series unit 23, 35, 36 including a plurality of switching elements or diodes; and the DC capacitor 29, 39 connected to the series unit in parallel, and is configured to selectively output voltage of the DC capacitor 29, 39 through switching operation, the configuration of the converter cell 20, 30 is not limited to those shown in FIG. 3, FIG. 4.

Next, a configuration of the converter cells 10 in the phase arm 4U, 4V, 4W of the power converter 1 is further described.

The converter cells 10 in the positive arm 5U, 5V, 5W are implemented by the converter cells 20 which can output positive voltage at both ends of the DC capacitor 29 and zero voltage as shown in FIG. 3, or are implemented by the converter cells 30 which can output positive voltage and negative voltage at both ends of the DC capacitor 39 and zero voltage as shown in FIG. 4, or are configured to include both the converter cells 20 and the converter cells 30.

Meanwhile, the converter cells 10 in the negative arm 6U, 6V, 6W are implemented only by the converter cells 30 which can output positive voltage and negative voltage at both ends of the DC capacitor 39 and zero voltage as shown in FIG. 4.

That is, all the converter cells 10 in the negative arm 6U, 6V, 6W are implemented by the converter cells 30 which can output negative voltage, and the converter cells 10 in the positive arm 5U, 5V, 5W are implemented by a combination of the converter cells 20 which can output positive voltage and zero voltage and the converter cells 30 which can output negative voltage. Alternatively, the converter cells 10 in the positive arm 5U, 5V, 5W are implemented by either the converter cells 20 or the converter cells 30.

It is sufficient that the converter cells 10 in the phase arm 4U, 4V, 4W are configured such that at least arms (positive arm 5U, 5V, 5W or negative arm 6U, 6V, 6W) at only one side are composed of the converter cells 30 which can output negative voltage. All the converter cells 10 in the positive arm 5U, 5V, 5W may be implemented by the converter cells 30 which can output negative voltage, and the converter cells 10 in the negative arm 6U, 6V, 6W may be implemented by a combination of the converter cells 20 which can output positive voltage and zero voltage and the converter cells 30 which can output negative voltage. Alternatively, the converter cells 10 in the negative arm 6U, 6V, 6W may be implemented by either the converter cells 20 or the converter cells 30.

Figure 5:
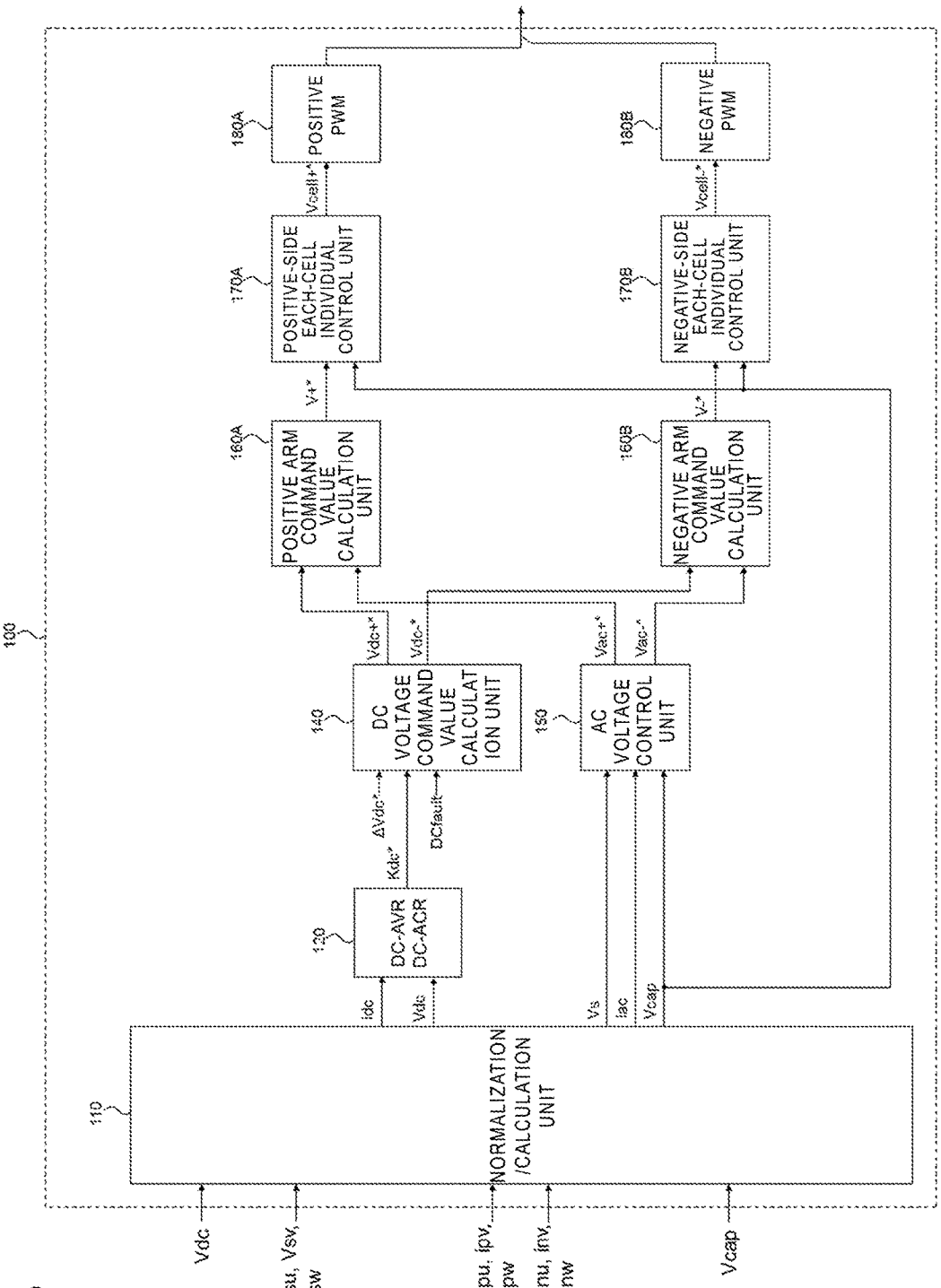
FIG. 5 is a block diagram showing a control device included in the power conversion device according to embodiment 1 of the present invention.

FIG. 5 is a block diagram showing a configuration example of the control device 100 in the power conversion device according to embodiment 1 of the present invention.

The control device 100 includes the PWM circuit and the voltage command value generation unit composed of various control systems as described above. The voltage command value generation unit includes: a normalization/calculation unit 110 for converting detected current value/ voltage value into a signal to be used in control; a DC-AVR/DC-ACR control unit (DC constant voltage/DC constant current controller) 120 for generating a DC voltage command value Kdc* on the basis of DC current Idc and DC voltage Vdc to control DC terminal voltage; a DC voltage command value calculation unit 140 for calculating a DC voltage command value Vdc+*, Vdc−* for positive arm/negative arm on the basis of the DC voltage command value Kdc* obtained by the DC-AVR/DC-ACR control unit 120, a DC voltage adjustment amount ΔVdc*, and a DC short circuit fault detection signal DCfault; an AC voltage control unit 150 for calculating AC voltage command values Vac+*, Vac−* on the basis of AC voltage Vs, AC current Iac, and DC capacitor voltage Vcap, to control AC voltage; positive and negative arm voltage command value calculation units 160A, 160B for calculating arm voltage command values V+*, V−* on the basis of the command values calculated by the DC voltage command value calculation unit 140 and the AC voltage control unit 150; and each-cell individual control units 170A, 170B for outputting voltage command values Vcell+*, Vcell−* for converter cells on the basis of command values V+*, V−* calculated by the positive and negative arm voltage command value calculation units 160A, 160B.

It should be noted that a voltage command generation unit is composed of the normalization/calculation unit 110, the DC-AVR/DC-ACR control unit 120, a DC voltage adjustment amount calculation unit 130, the DC voltage command value calculation unit 140, the AC voltage control unit 150, the positive arm voltage command value calculation unit 160A, the negative arm voltage command value calculation unit 160B, the positive-side each-cell individual control unit 170A, and the negative-side each-cell individual control unit 170B, and a voltage command value for the positive arm and a voltage command value for the negative arm are generated.

PWM circuits 180A, 180B generate a gate signal for performing PWM control of the switching elements of each converter cell 10 in the positive arms 5U, 5V, 5W and negative arms 6U, 6V, 6W of the respective phases, on the basis of the positive-side each-cell voltage command value Vcell+* and the negative-side each-cell voltage command value Vcell−*. The switching elements 21s, 22s (31s, 32s, 34s) in each converter cell 10 are controlled to be driven according to the generated gate signal, whereby the output voltage of the power converter 1 is controlled to have a desired value.

In the following, description is given of the DC voltage command value calculation unit 140 which calculates, during a DC short circuit fault, the DC voltage command values Vdc+*, Vdc−* for the positive arm and the negative arm, respectively, which is the major part of the present invention, in particular.

First, the positive arm voltage command value V+* outputted from the positive arm voltage command value calculation unit 160A and the negative arm voltage command value V−* outputted from the negative arm voltage command value calculation unit 160B are described. The positive arm voltage command value V+* is determined in accordance with the DC voltage command value Vdc+* outputted from the DC voltage command value calculation unit 140 and the AC voltage command value Vac+* outputted from the AC voltage control unit 150. The negative arm voltage command value V−* is determined in accordance with the DC voltage command value Vdc−* outputted from the DC voltage command value calculation unit 140 and the AC voltage command value Vac−* outputted from the AC voltage control unit 150. That is, each of the arm voltage command values V+*, V−* respectively outputted from the positive and negative arm voltage command value calculation units 160A, 160B contains two components of DC and AC.

Each converter cell 10 in the positive arm 5U, 5V, 5W is implemented by the converter cell 20 in half-bridge configuration which can output positive voltage and zero voltage, and the voltage command value to be provided to the converter cell 10 in the positive arm is limited to a positive range. That is, the DC voltage command value Vdc+* for the positive arm is limited to a positive value. The maximum amplitude of the AC voltage command value Vac+* for the positive arm is dependent on the DC voltage command value Vdc+*.

Meanwhile, each converter cell 10 in the negative arm 6U, 6V, 6W is implemented by the converter cell 30 in 1.5 bridge configuration which can output positive voltage, negative voltage, and zero voltage. Although depending on the current flowing in the converter cell, the voltage command value to be provided to the converter cell 10 in the negative arm can be in a positive range or in a negative range. That is, the DC voltage command value Vdc−* for the negative arm is selectable between a positive value and a negative value. The AC voltage command value Vac−* for the negative arm is set so as to have opposite polarity to that of the AC voltage command value Vac+* for the positive arm.

The DC terminals P, N of the DC lines 2, 3 have the positive arms and the negative arms connected thereto in series. Thus, voltage that substantially matches the sum of the positive arm voltage command value V+* and the negative arm voltage command value V−* is outputted to the DC terminals P, N. The positive arm AC voltage command value Vac+* and the negative arm AC voltage command value Vac−* have opposite polarities to each other, and thus cancel each other. Thus, voltage that substantially matches the sum of the positive arm DC voltage command value Vdc+* and the negative arm DC voltage command value Vdc−* is outputted to the DC terminals P, N. Here, when the positive arm DC voltage command value Vdc+* is provided with the DC voltage command value Kdc* obtained by the DC-AVR/DC-ACR control unit 120, and the negative arm DC voltage command value Vdc−* is provided with the sum of the DC voltage adjustment amount ΔVdc* and the DC voltage command value Kdc* having opposite polarity, the DC voltage adjustment amount ΔVdc* is outputted to the DC terminals P, N. During a fault in which the DC lines 2, 3 are short-circuited, if the power converter 1 outputs voltage corresponding to the above DC voltage adjustment amount ΔVdc* to the DC terminals P, N, DC current flows in the DC lines 2, 3 in accordance with the DC line impedance.

When the positive arm DC voltage command value Vdc+* is provided with the DC voltage command value Kdc*, and the negative arm DC voltage command value Vdc−* is provided with the DC voltage command value Kdc* having opposite polarity, if the magnitude of the DC voltage command value Kdc* is set to be a magnitude that allows output of the AC voltage command values Vac+*, Vac−*, interconnection with the AC grid is also allowed.

As described above, by controlling the negative arm DC voltage command value Vdc−*, in a state where interconnection with the AC grid is established during a fault, it is possible to cause current that allows fault detection to flow in the DC lines 2, 3. It should be noted that during occurrence of a fault, arc voltage occurs at the DC terminals P, N, and thus, voltage against the arc voltage is outputted, and then, after the DC terminal voltage is sufficiently lowered, current that allows fault detection is caused to flow in the DC lines 2, 3.

Figure 6:
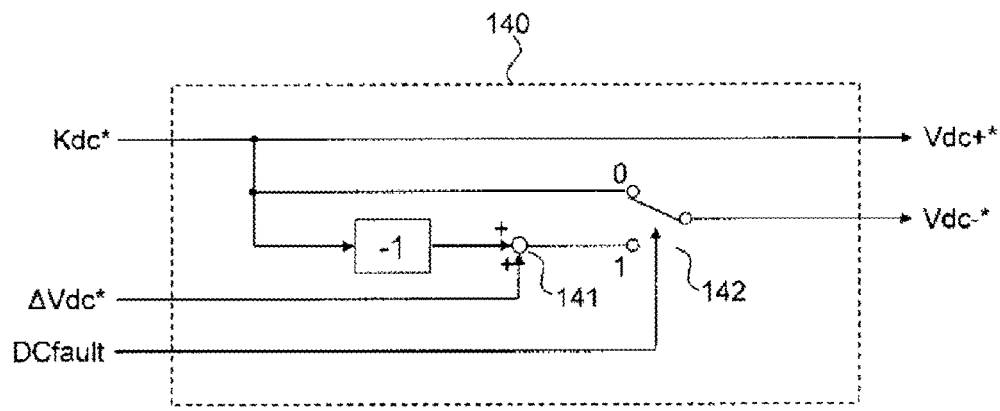
FIG. 6 is a block diagram showing a DC voltage command value calculation unit used in the control device of the power conversion device according to embodiment 1 of the present invention.

Here, a method for calculating the DC voltage command value Vdc+*, Vdc−* is described. FIG. 6 shows a configuration of the DC voltage command value calculation unit 140 in detail. The DC voltage command value calculation unit 140 calculates the positive arm DC voltage command value Vdc+* from the DC voltage command value Kdc* obtained by the DC-AVR/DC-ACR control unit 120, and the negative arm DC voltage command value Vdc−* from the DC voltage command value Kdc* and the DC voltage adjustment amount ΔVdc*. The DC voltage adjustment amount ΔVdc* is a value previously set so as to realize voltage that is not less than voltage necessary to cause current at a level which allows the protection relay 93 to operate, to flow in the DC lines 2, 3, and that is not greater than voltage that causes current to flow that is not greater than a level of overcurrent at which the power converter 1 stops.

The DC voltage command value calculation unit 140 is configured such that, with respect to the positive arm DC voltage command value Vdc+*, the DC voltage command value Kdc* is always provided. Meanwhile, with respect to the negative arm DC voltage command value Vdc−*, a switch 142 is operated on the basis of a signal DCfault (in steady state: 0, during fault: 1) provided by a DC short circuit fault detector not shown, whereby a DC voltage command value is provided that is different depending on the presence/absence of a DC short circuit fault. That is, with respect to the negative arm DC voltage command value Vdc−*, the DC voltage command value Kdc* is provided in a steady state "0", and a value obtained by an adder 141 adding the value of the DC voltage command value Kdc* having opposite polarity and the DC voltage adjustment amount ΔVdc* is provided during a fault "1".

In a steady state, the DC short circuit fault detection signal DCfault is "0", and thus, the same component DC voltage command value Kdc* is provided for the positive arm DC voltage command value Vdc+* and the negative arm DC voltage command value Vdc−*. That is, a command value that would allow output of a predetermined DC voltage to the DC terminals P, N is calculated.

Meanwhile, during a DC short circuit fault, the DC short circuit fault detection signal DCfault is "1", and the polarity of the DC voltage command value Kdc* is reversed, and the value of the DC voltage adjustment amount ΔVdc* is added. Therefore, different DC voltage command values are provided for the positive arm DC voltage command value Vdc+* and the negative arm DC voltage command value Vdc−*, respectively. That is, a command value that would allow output of the DC voltage adjustment amount ΔVdc* to the DC terminals P, N is calculated.

In the present embodiment, the DC voltage adjustment amount ΔVdc* is added to the DC voltage command value Kdc*, and the resultant value is provided as the negative arm DC voltage command value Vdc−*. However, unless exceeding a level that allows interconnection with the AC grid, the DC voltage adjustment amount ΔVdc* may be added to the DC voltage command value Kdc*, and the resultant value may be provided as the positive arm DC voltage command value Vdc+*.

As described above, in the present embodiment 1, all the converter cells 10 in the negative arm 6U, 6V, 6W are implemented by the converter cells 30 which can output negative voltage, and the converter cells 10 in the positive arm 5U, 5V, 5W are implemented by the converter cells 20 which can output positive voltage and zero voltage. Accordingly, when a DC short circuit fault has occurred, the DC voltage command value calculation unit 140, which calculates the positive arm DC voltage command value Vdc+* and the negative arm DC voltage command value Vdc−*, can cause AC voltage similar to that in a steady state to be outputted to the AC end of the power converter 1, and can cause predetermined voltage to be outputted to the DC terminal of the power converter 1, the predetermined voltage allowing a level of current to flow, the current allowing the protection relay 93 to perform fault determination. Accordingly, by causing current based on the impedance value of the resistance component of the DC line 2, 3 to flow in the DC line 2, 3, the protection relay 93 on the DC line 2, 3 is allowed to operate, thereby detecting and removing the fault point.

In a case of the main circuit configuration as described above, as a result of the gate blocking performed by the converter cells 10 during a DC short circuit fault, the total sum of the capacitor voltages of the converter cells 30 can be outputted to the DC terminals of the power converter 1, whereby the fault current can be suppressed. That is, by increasing the proportion of the converter cells 30 in the phase arm, the voltage to be outputted to the DC terminal of the power converter 1 is increased, whereby fault current suppressing effect is enhanced.

Also in a main circuit configuration in which the fault current suppressing effect has been increased as a result of increase of the proportion of the converter cells 30 in the phase arm such that the converter cells 10 in the positive arm are implemented by the converter cells 30 or configured to include both the converter cells 20 and the converter cells 30, and the converter cells 10 in the negative arm are implemented only by the converter cells 30, AC voltage similar to that in a steady state can be outputted to the AC terminal of the power converter 1, and current that allows the protection relay 93 to perform fault determination can be outputted to the DC terminal.

Embodiment 2

Figure 7:
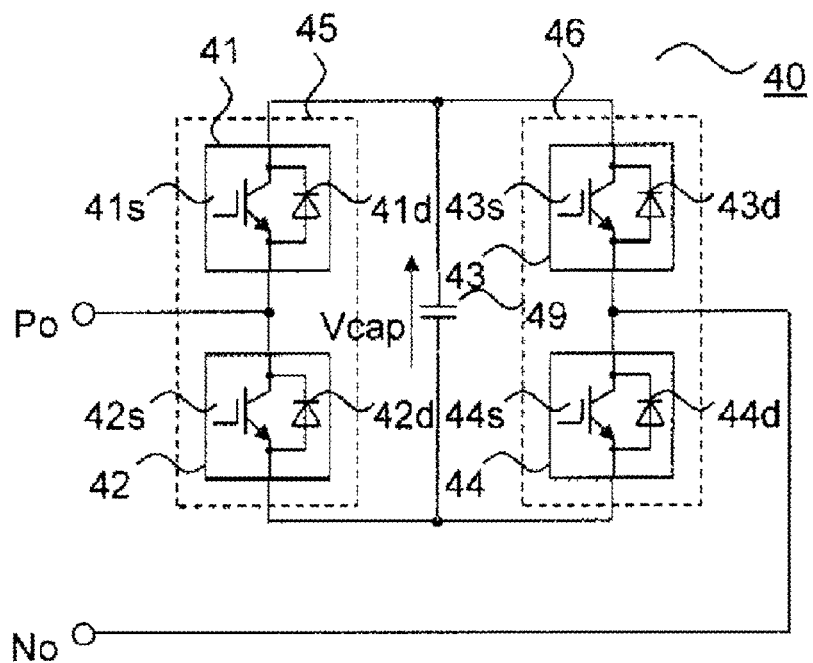
FIG. 7 is a circuit diagram showing a configuration of a converter cell of a power conversion device according to embodiment 2 of the present invention.

Next, a power conversion device according to embodiment 2 of the present invention is described in detail with reference to FIG. 7. FIG. 7 is a circuit diagram of a converter cell 40 employing a full-bridge configuration to be used as the converter cell of the power conversion device according to embodiment 2 of the present invention.

In the power conversion device of embodiment 2, the converter cells 10 in the positive arm 5U, 5V, 5W of the power converter 1 shown in FIG. 2 are implemented by the converter cells 20 in half-bridge configuration, and the converter cells 10 in the negative arm 6U, 6V, 6W are implemented by the converter cells 40 in full-bridge configuration. Other configurations are the same as those of embodiment 1 described above, and thus, description thereof is omitted.

The converter cell 40 shown in FIG. 7 is composed of: two series units 45, 46 connected in parallel; and a DC capacitor 49 connected in parallel to the series units 45, 46 and for smoothing DC voltage. Each series unit 45, 46 is composed of a plurality of (two in the case of FIG. 7) switching elements 41s, 42s, 43s, 44s connected in series, the switching elements 41s, 42s, 43s, 44s having diodes 41d, 42d, 43d, 44d connected thereto in anti-parallel. Switches 41, 42, 43, 44 in which the switching elements 41s, 42s, 43s, 44s are each implemented by a self-turn-off switching element such as IGBT or GCT and have the diodes 41*d*, 42*d*, 43*d*, 44*d* connected thereto in anti-parallel, are used.

As shown in FIG. 7, in the converter cell 40, the terminal at the connection point between the switching elements 41*s*, 42*s* and the terminal at the connection point between the switching elements 43*s*, 44*s*, the terminals respectively serving as intermediate connection points for the series units 45, 46, are used as output terminals Po, No. Then, the switching elements 41*s*, 42*s*, 43*s*, 44*s* are turned on/off, whereby same-polarity positive voltage and opposite-polarity negative voltage, having a magnitude substantially equal to the magnitude of the voltage at both ends of the DC capacitor 39, and zero voltage in a state where the output terminals Po, No are short-circuited by the switching elements are outputted from the output terminals Po, No.

As long as the converter cell 40 includes: a series unit including a plurality of switching elements or diodes; and a DC capacitor connected in parallel to the series unit, and is configured to selectively output voltage of the DC capacitor through switching operation, the configuration of the converter cell 40 is not limited to that shown in FIG. 7.

Next, a configuration of the converter cells 10 in the phase arm 4U, 4V, 4W of the power converter 1 is described. The converter cells 10 in the positive arm 5U, 5V, 5W are implemented by the converter cells 20 which can output positive voltage at both ends of the DC capacitor 29 and zero voltage as shown in FIG. 3. The converter cells 10 in the negative arm 6U, 6V, 6W are implemented by the converter cells 40 which can output positive voltage and negative voltage at both ends of the DC capacitor 49 and zero voltage as shown in FIG. 7.

With the configuration described above, during a DC short circuit fault, the converter cells 10 in the positive arm operate so as to output positive DC voltage and AC voltage that would allow interconnection with the AC grid, and the converter cells 10 in the negative arm operate so as to output negative DC voltage and AC voltage having opposite polarity to that in the positive arm. That is, when a DC short circuit fault has occurred, AC voltage similar to that in a steady state can be outputted to the AC terminal of the power converter 1, and voltage that causes current to flow, the current allowing the protection relay 93 to perform fault determination, can be outputted to the DC terminal of the power converter 1.

Also in a main circuit configuration in which in order to increase the fault current suppressing effect, the converter cells 10 in the positive arm are implemented by the converter cells 40 or configured to include both the converter cells 20 and the converter cells 40 and the converter cells 10 in the negative arm are implemented only by the converter cells 40, AC voltage similar to that in a steady state can be outputted to the AC terminal of the power converter 1, and voltage that causes current to flow, the current allowing the protection relay 93 to perform fault determination, can be outputted to the DC terminal of the power converter 1.

It is sufficient that the converter cells 10 in the phase arm 4U, 4V, 4W are configured such that at least arms (positive arm 5U, 5V, 5W or negative arm 6U, 6V, 6W) at only one side are composed of the converter cells 40 which can output negative voltage. All the converter cells 10 in the positive arm 5U, 5V, 5W may be implemented by the converter cells 40 which can output negative voltage, and the converter cells 10 in the negative arm 6U, 6V, 6W may be implemented by the converter cells 20 which can output positive voltage and zero voltage.

Embodiment 3

Figure 8:
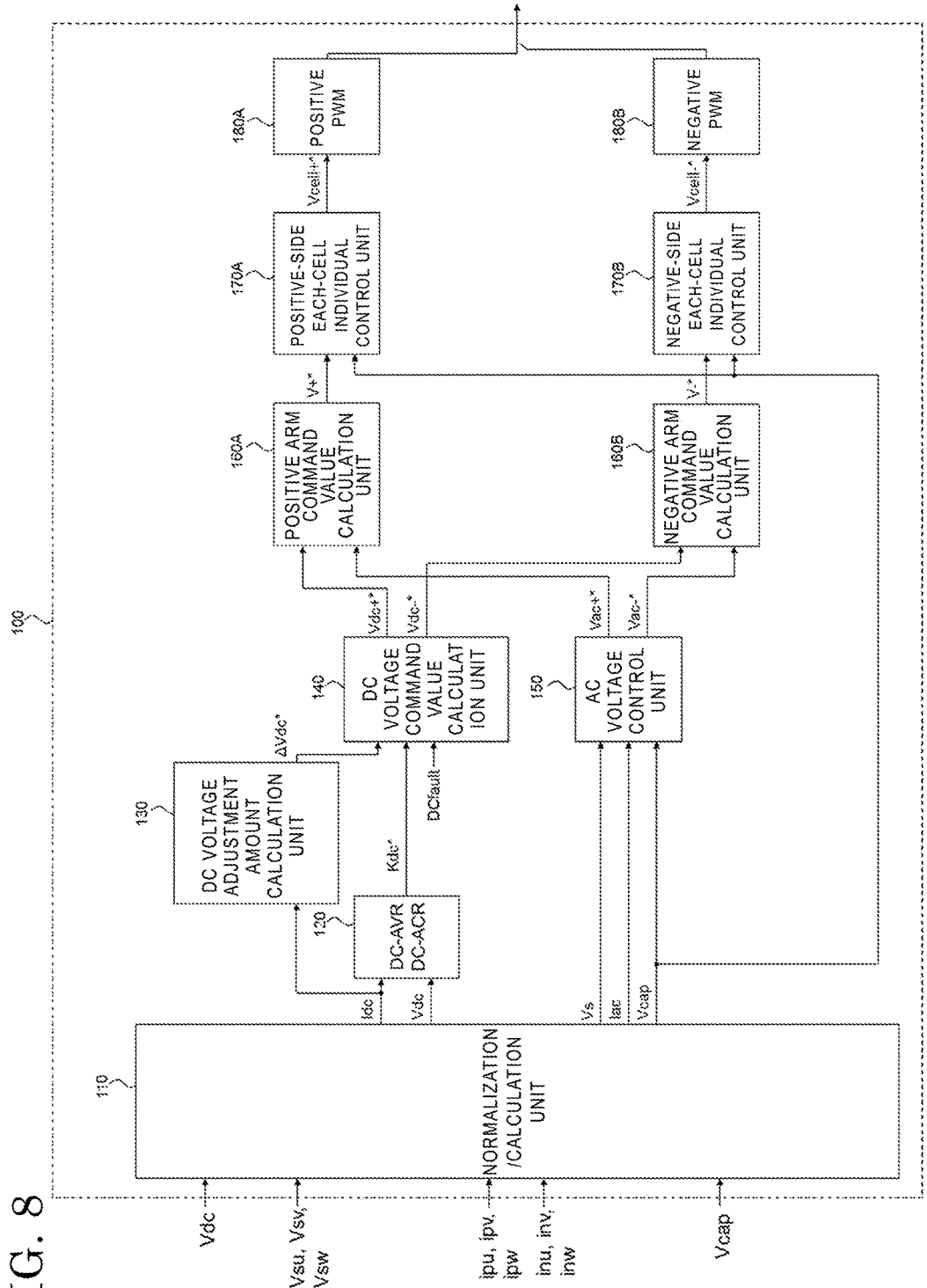
FIG. 8 is a block diagram showing a control device included in a power conversion device according to embodiment 3 of the present invention.

Next, a power conversion device according to embodiment 3 of the present invention is described in detail with reference to FIG. 8 and FIG. 9. FIG. 8 is a block diagram showing a configuration of the control device 100 in the power conversion device according to embodiment 3 of the present invention.

In FIG. 8, except that the DC voltage adjustment amount calculation unit 130 for calculating the DC voltage adjustment amount $\Delta Vdc^*$ on the basis of the DC current Idc is provided, the configuration is the same as that of the control device 100 in embodiment 1 shown in FIG. 5. Thus, the same or like parts are denoted by the same reference characters as those used above, and description thereof is omitted.

Figure 9:
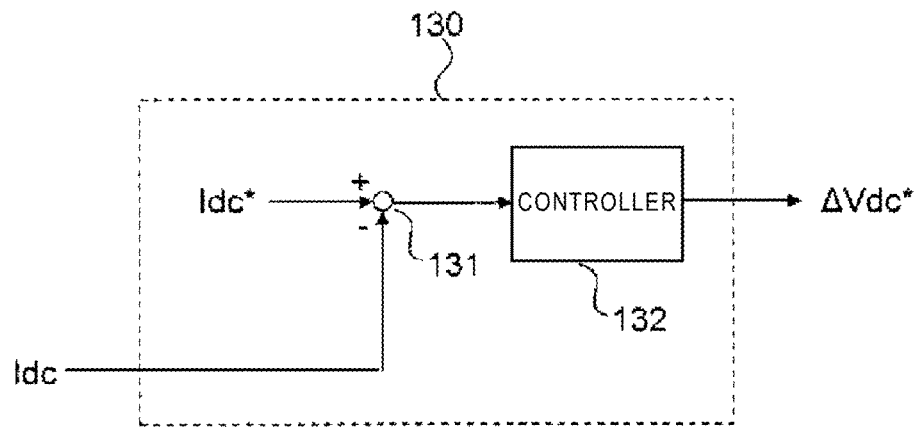
FIG. 9 is a block diagram showing a DC voltage adjustment amount calculation unit used in the control device of the power conversion device according to embodiment 3 of the present invention.

FIG. 9 shows a configuration of the DC voltage adjustment amount calculation unit 130 of the power conversion device according to the present embodiment 3. The DC voltage adjustment amount calculation unit 130 is composed of a subtractor 131 and a controller 132.

With reference to FIG. 9, the DC voltage adjustment amount calculation unit 130 provides the DC voltage adjustment amount $\Delta Vdc^*$, as a result of the controller 132 performing control such that the difference between the DC current Idc and a DC current command value Idc* becomes close to zero, the DC current command value Idc* causing current to flow that is not less than a level of current at which the protection relay 93 on the DC line 2, 3 operates, and that is not greater than a level of current at which the power converter 1 stops for protection.

As to the DC current command value Idc*, as long as the DC current command value Idc* causes current to flow that is not less than a level of current at which the protection relay 93 on the DC line 2, 3 operates and that is not greater than a level of current at which the power converter 1 stops for protection, any one of a DC component, an AC component, or two components of a DC component and an AC component may be provided. Alternatively, a triangular wave or the like may be provided instead of the AC component.

In a case where the DC voltage adjustment amount $\Delta Vdc^*$ is a DC component, current based on the impedance value of the resistance component of the DC line 2, 3 can be caused to flow in the DC line 2, 3. In a case where the DC voltage adjustment amount $\Delta Vdc^*$ is an AC component, current based on the impedance value of the reactor component regarding the DC line 2, 3 can be caused to flow in the DC line 2, 3. This allows the protection relay 93 to operate.

With the configuration described above, during a DC short circuit fault, the power converter 1 outputs, to the DC terminal thereof, voltage in accordance with the DC voltage adjustment amount $\Delta Vdc^*$, thereby causing DC current to flow in the DC line 2, 3. The DC current Idc increases until fault detection is performed by the protection relay 93 on the DC line 2, 3, and upon detection of a fault, the DC breakers 92 installed in the other side of the fault point on the DC line 2, 3 open, whereby the fault point is removed.

Embodiment 4

Figure 10:
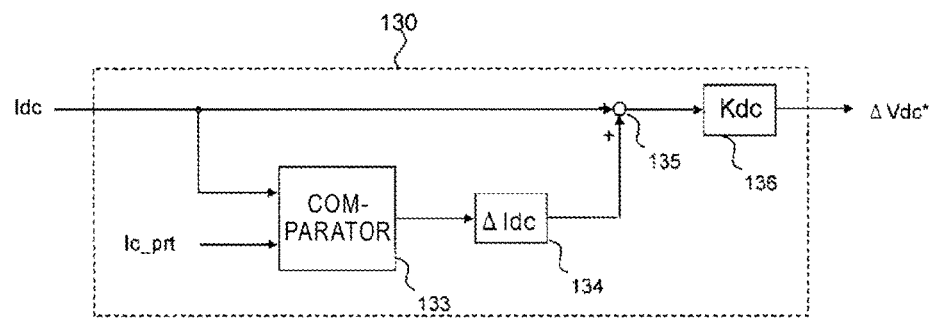
FIG. 10 is a block diagram showing a DC voltage adjustment amount calculation unit used in a control device of a power conversion device according to embodiment 4 of the present invention.

Next, a power conversion device according to embodiment 4 of the present invention is described in detail with reference to FIG. 10. FIG. 10 is a diagram showing a configuration of the DC voltage adjustment amount calculation unit 130 used in the control device 100 in the power conversion device according to embodiment 4 of the present invention.

The configuration of the control device 100 in the power conversion device according to the present embodiment 4 is the same as that shown in FIG. 8. The DC voltage adjustment amount calculation unit 130 used therein is composed of a comparator 133, a current adjuster 134, an adder 135, and a voltage command value converter 136, as shown in FIG. 10.

The voltage command value converter 136 calculates the DC voltage adjustment amount $\Delta Vdc^*$ on the basis of the magnitude of the DC current Idc, and provides the DC voltage adjustment amount $\Delta Vdc^*$ that would cause current to flow that is not greater than a level of current at which the power converter 1 stops for protection.

In the DC voltage adjustment amount calculation unit 130 shown in FIG. 10, first, the comparator 133 determines whether or not the magnitude of the DC current Idc is smaller than a value Ic_prt set to be not greater than the protection current level of the power converter 1. When the magnitude of the DC current Idc is smaller than the value Ic_prt, the comparator 133 outputs "1", multiplication by a current increase amount $\Delta Idc$ is performed at the current adjuster 134, and the resultant value is added to the DC current Idc by the adder 135. The output from the adder 135 is multiplied by a voltage command value conversion gain Kdc at the voltage command value converter 136, whereby the DC voltage adjustment amount $\Delta Vdc^*$ is calculated.

When the DC current Idc* which is the input to the comparator 133 is greater than the Ic_prt, the output from the comparator 133 is "0", and the value of the last time is outputted as the DC voltage adjustment amount $\Delta Vdc^*$. That is, the DC voltage adjustment amount $\Delta Vdc^*$ is provided that would cause current to flow in the DC line 2, 3, the current having a DC component that allows the protection relay 93 to operate.

With the configuration described above, during a DC short circuit fault, the power converter 1 outputs voltage in accordance with the DC voltage adjustment amount $\Delta Vdc^*$, thereby causing the current Idc having a DC component to flow in the DC line 2, 3. The DC current Idc increases until fault detection is performed by the protection relay 93 on the DC line 2, 3, and upon detection of a fault, the DC breakers 92 installed in the other side of the fault point on the DC line 2, 3 open, whereby the fault point is removed.

Embodiment 5

Figure 11:
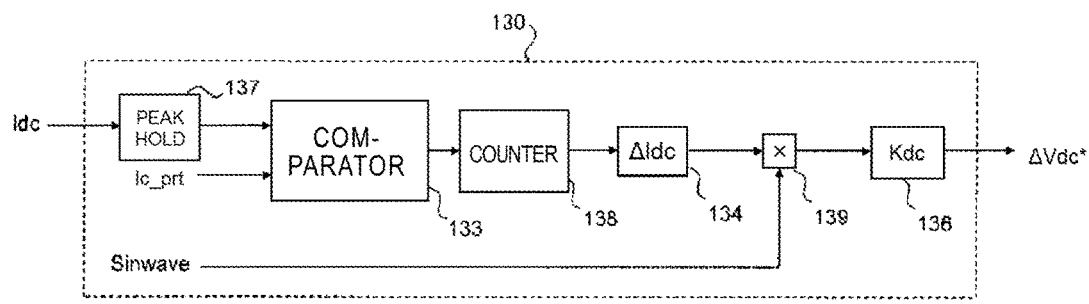
FIG. 11 is a block diagram showing a DC voltage adjustment amount calculation unit used in a control device of a power conversion device according to embodiment 5 of the present invention.

Next, a power conversion device according to embodiment 5 of the present invention is described in detail with reference to FIG. 11. FIG. 11 is a diagram showing a configuration of the DC voltage adjustment amount calculation unit 130 used in the control device 100 of the power conversion device according to embodiment 5 of the present invention.

The configuration of the control device 100 in the power conversion device according to the present embodiment 5 is the same as that shown in FIG. 8. The DC voltage adjustment amount calculation unit 130 used therein is composed of the comparator 133, the current adjuster 134, the voltage command value converter 136, a peak value holding circuit 137, a counter 138, and a multiplier 139, as shown in FIG. 11.

With reference to FIG. 11, in the DC voltage adjustment amount calculation unit 130, first, the peak value holding circuit 137 holds the peak value of the DC current Idc. The comparator 133 determines whether or not the peak value of the DC current is smaller than the value Ic_prt set so as to be not greater than the protection current level of the power converter 1. When the peak value of the DC current is smaller than the value Ic_prt, the comparator 133 outputs "1" and when the peak value of the DC current is greater than the value Ic_prt, the comparator 133 outputs "0".

When "1" is inputted, the counter 138 increments the count for each calculation cycle, and when "0" is inputted, the counter 138 stops incrementing the count. The output from the counter 138 is multiplied by the current increase amount $\Delta Idc$ at the current adjuster 134, and at the multiplier 139, the resultant value is multiplied by a sine wave having a frequency that is twice of the frequency of the AC power grid 9, for example. The value used in the multiplication may be a sine wave of another frequency component, triangular wave, or the like. The output from the multiplier 139 is multiplied by the voltage command value conversion gain Kdc at the voltage command value converter 136, whereby the DC voltage adjustment amount $\Delta Vdc^*$ is calculated. That is, the DC voltage adjustment amount $\Delta Vdc^*$ is provided that would cause current to flow in the DC line 2, 3, the current having an AC component that allows the protection relay 93 to operate.

With the configuration described above, during a DC short circuit fault, the power converter 1 outputs voltage in accordance with the DC voltage adjustment amount $\Delta Vdc^*$, thereby causing current having the AC component or the like to flow in the DC line 2, 3. The DC current Idc increases until fault detection is performed by the protection relay 93 on the DC line 2, 3, and upon detection of a fault, the DC breakers 92 installed in the other side of the fault point on on the DC line 2, 3 open, whereby the fault point is removed.

Embodiment 6

Figure 12:
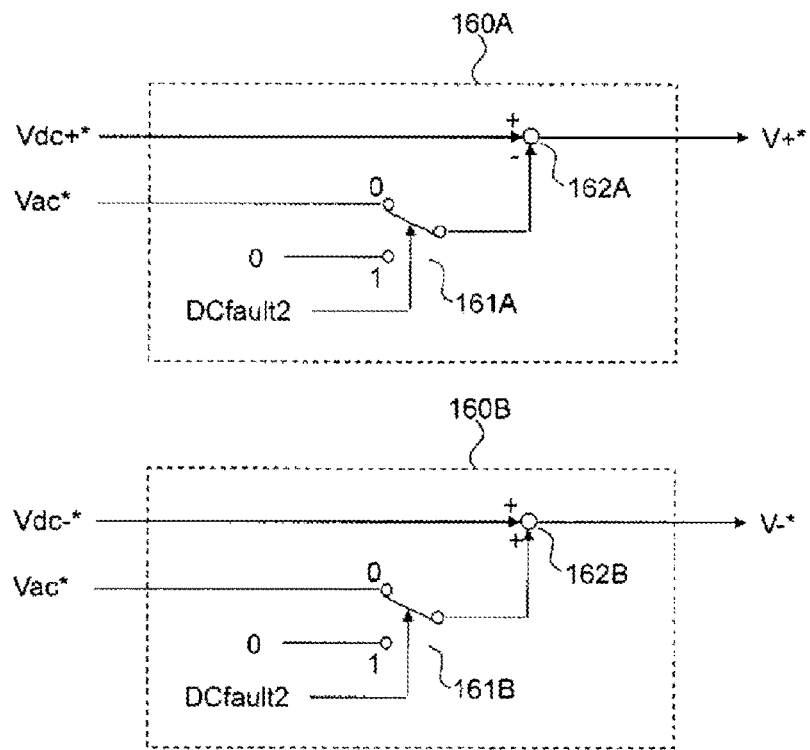
FIG. 12 is a block diagram showing a configuration of positive and negative arm voltage command value calculation units used in a control device of a power conversion device according to embodiment 6 of the present invention.

Next, a power conversion device according to embodiment 6 of the present invention is described in detail with reference to FIG. 12. FIG. 12 is a diagram showing configurations of the positive and negative arm voltage command value calculation units 160A, 160B used in the control device 100 in the power conversion device according to embodiment 6 of the present invention.

The configuration of the control device 100 in the power conversion device according to the present embodiment 6 is the same as that shown in FIG. 5 or FIG. 8, and thus, description thereof is omitted.

In FIG. 12, the positive arm voltage command value calculation unit 160A and the negative arm voltage command value calculation unit 160B calculate the positive arm voltage command value V+* and the negative arm voltage command value V-* on the basis of the DC voltage command values Vdc+*, Vdc-*, the AC voltage command value Vac*, and a signal DCfault2 indicating the presence/absence of AC interconnection.

On the basis of the signal DCfault2 indicating the presence/absence of AC interconnection (interconnection: 0, non-interconnection: 1), AC output switches 161A, 161B are operated. In the case of the AC interconnection "0", the AC voltage command value Vac* is provided to the arm DC voltage command values Vdc+*, Vdc-*, and in the case of non-AC interconnection "1", zero as the AC voltage command value Vac* is provided to the arm DC voltage command values Vdc+*, Vdc-*. In the case of non-AC interconnection, since interconnection with the AC grid is not established, current is caused to flow in the DC line 2, 3, by use of only the energy accumulated in the DC capacitor 29 (39, 49) in the converter cell 10. The DC current Idc increases until fault detection is performed by the protection relay 93 on the DC line 2, 3, and upon detection of a fault, the DC breakers 92 installed in the other side of the fault point on the DC line 2, 3 open, whereby the fault point is removed.

The converter cells 10 in the phase arm 4U, 4V, 4W of the power converter 1 may employ, in the positive arm 5U, 5V, 5W, and the negative arm 6U, 6V, 6W, any of a configuration in which both the converter cell 20 and the converter cell 40 are connected in series, the configuration of embodiment 1, and the configuration of embodiment 2.

Embodiment 7

Figure 13:
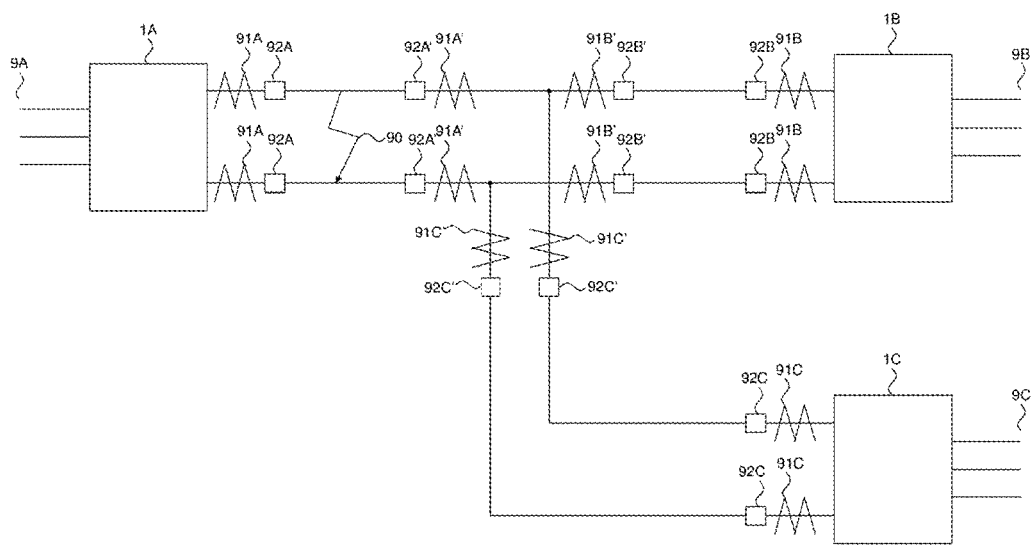
FIG. 13 is a schematic configuration diagram of a three-terminal HVDC system in which a power conversion device according to embodiment 7 of the present invention is used.

Next, a power conversion device according to embodiment 7 of the present invention is described in detail with reference to FIG. 13. FIG. 13 is a schematic configuration diagram of a three-terminal HVDC system in which the power conversion device according to embodiment 7 of the present invention is used.

As shown in FIG. 13, power converters 1A, 1B, 1C connected to AC grids 9A, 9B, 9C have their DC terminals connected by the DC line 2, 3, thereby forming the three-terminal HVDC system. In this configuration, the DC line 2, 3 is provided with: sensor groups 91A, 91A', 91B, 91B' 91C, 91C'; and DC breaker groups 92A, 92A', 92B, 92B', 92C, 92C'.

Figure 14:
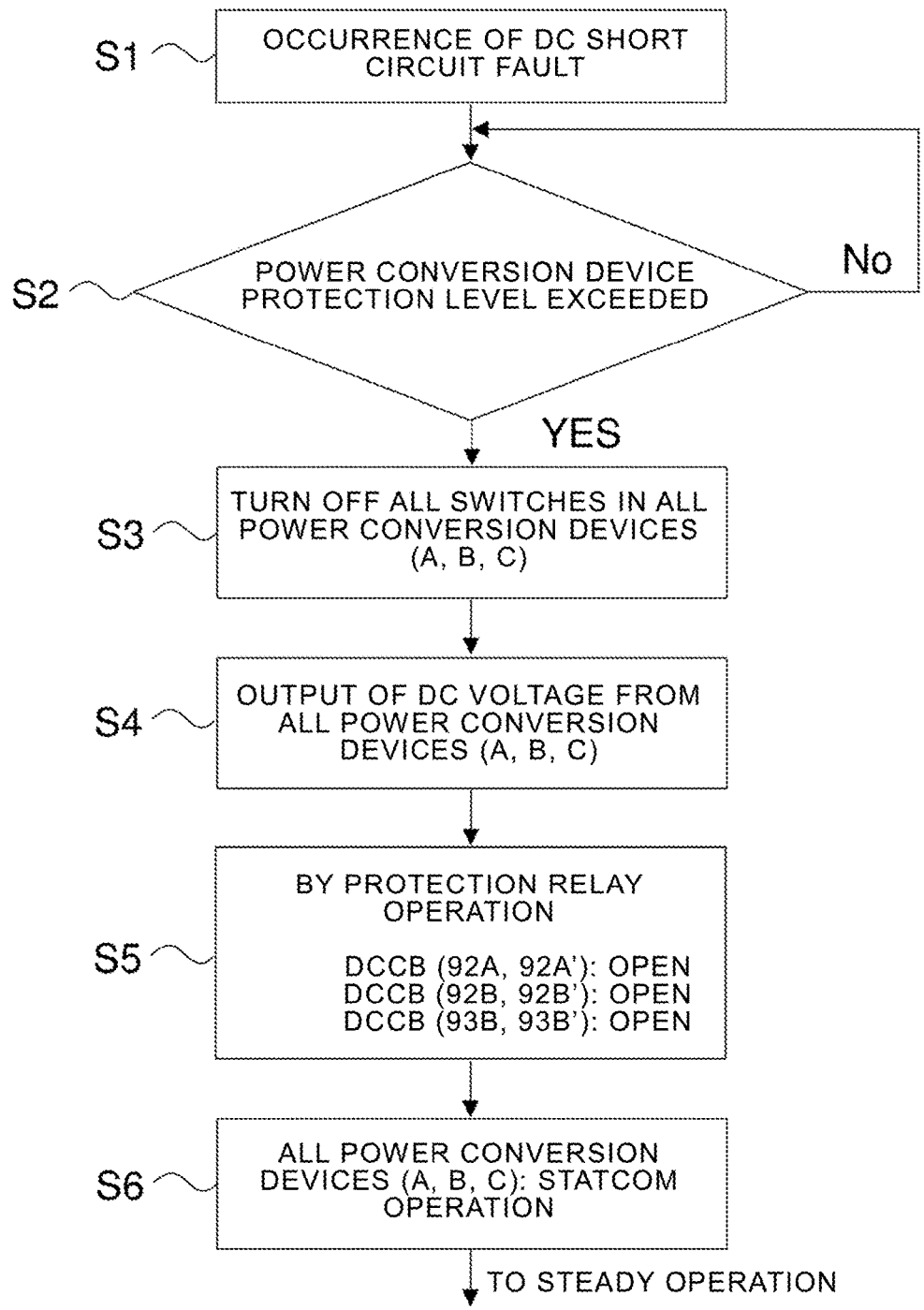
FIG. 14 is a flow chart describing operation of fault point removal using a protection relay and the power conversion device according to embodiment 7 of the present invention.

FIG. 14 is a flow chart describing operation of fault point removal by use of the protection relay and the power conversion device according to the embodiment 7 of the present invention.

DC fault removal to be performed when the DC lines 2, 3 are short-circuited in the HVDC system in three-terminal configuration is described with reference to FIG. 13 and FIG. 14.

When a DC short circuit fault 90 has occurred at a nearest end to the power converter 1A (or 1B, 1C) (S1), each power converter 1A, 1B, 1C detects that a protection level (e.g., current value), set in advance, of the power conversion device has been exceeded (S2), and turns off all the switching elements in each power conversion device 1A, 1B, 1C (S3). By turning off the switching elements, fault current flowing in each power conversion device 1A, 1B, 1C can be suppressed.

Next, each power conversion device 1A, 1B, 1C outputs, to the DC end, voltage that allows a protection relay not shown to perform fault determination and that each power converter 1A, 1B, 1C can output (S4), whereby the sensor group 91A, 91A', 91B, 91B', 91C, 91C' detects the fault and the breaker group 92A, 92A', 92B, 92B', 92C, 92C' is opened (S5). When the fault has been removed, impedance of the DC lines 2, 3 becomes high, and thus, the power converter 1A, 1B, 1C determines that the DC line fault has been removed, on the basis of the fact that predetermined current does not flow, for example.

The power converter 1A, 1B, 1C having been disconnected from the DC lines 2, 3 can operate as STATCOM which supplies reactive power to the AC grid 9A, 9B, 9C (S6).

Embodiment 8

Figure 15:
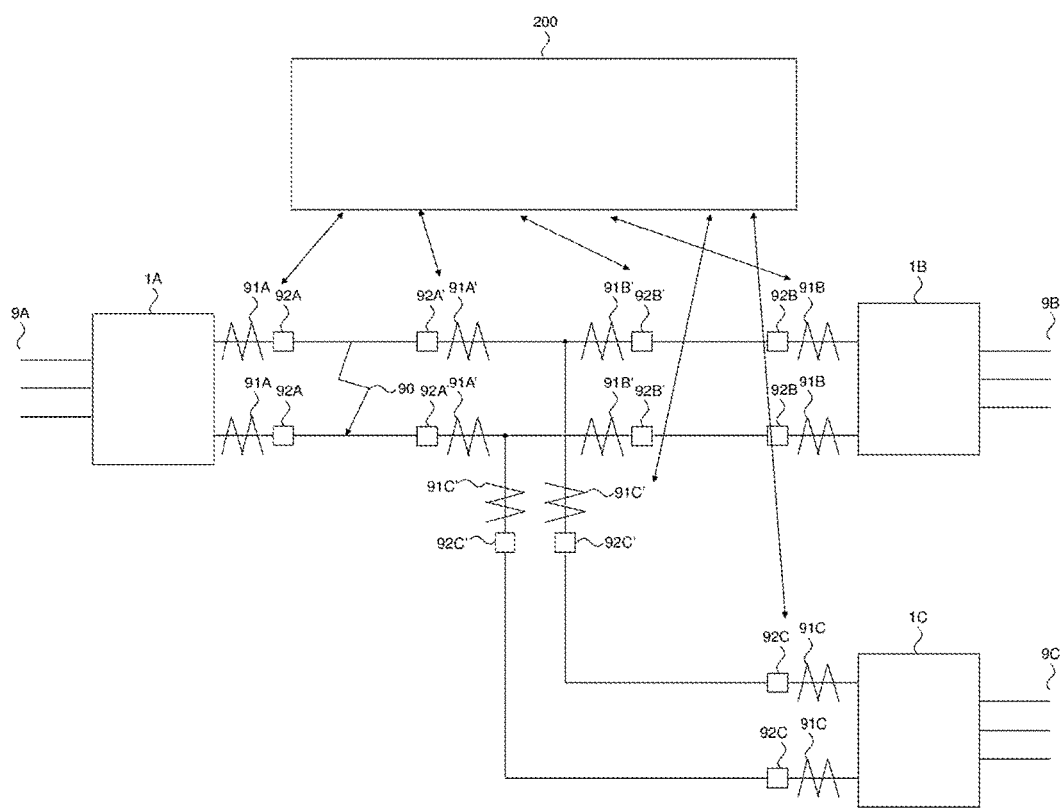
FIG. 15 is a schematic configuration diagram of a three-terminal HVDC system including a DC short circuit fault point determination unit according to embodiment 8 of the present invention.

Next, a power conversion device according to embodiment 8 of the present invention is described in detail with reference to FIG. 15. FIG. 15 is a schematic configuration diagram of a three-terminal HVDC system including a DC short circuit fault point determination unit according to embodiment 8 of the present invention.

As shown in FIG. 15, the open/close state of each breaker group 92A, 92A', 92B, 92B', 92C, 92C' on the DC lines is provided to a DC short circuit fault point determination unit 200. On the basis of the open/close state of the DC breakers, the DC short circuit fault point determination unit 200 determines a DC short circuit fault point, and provides each breaker with a command for operating the switch so as to remove the fault point.

Figure 16:
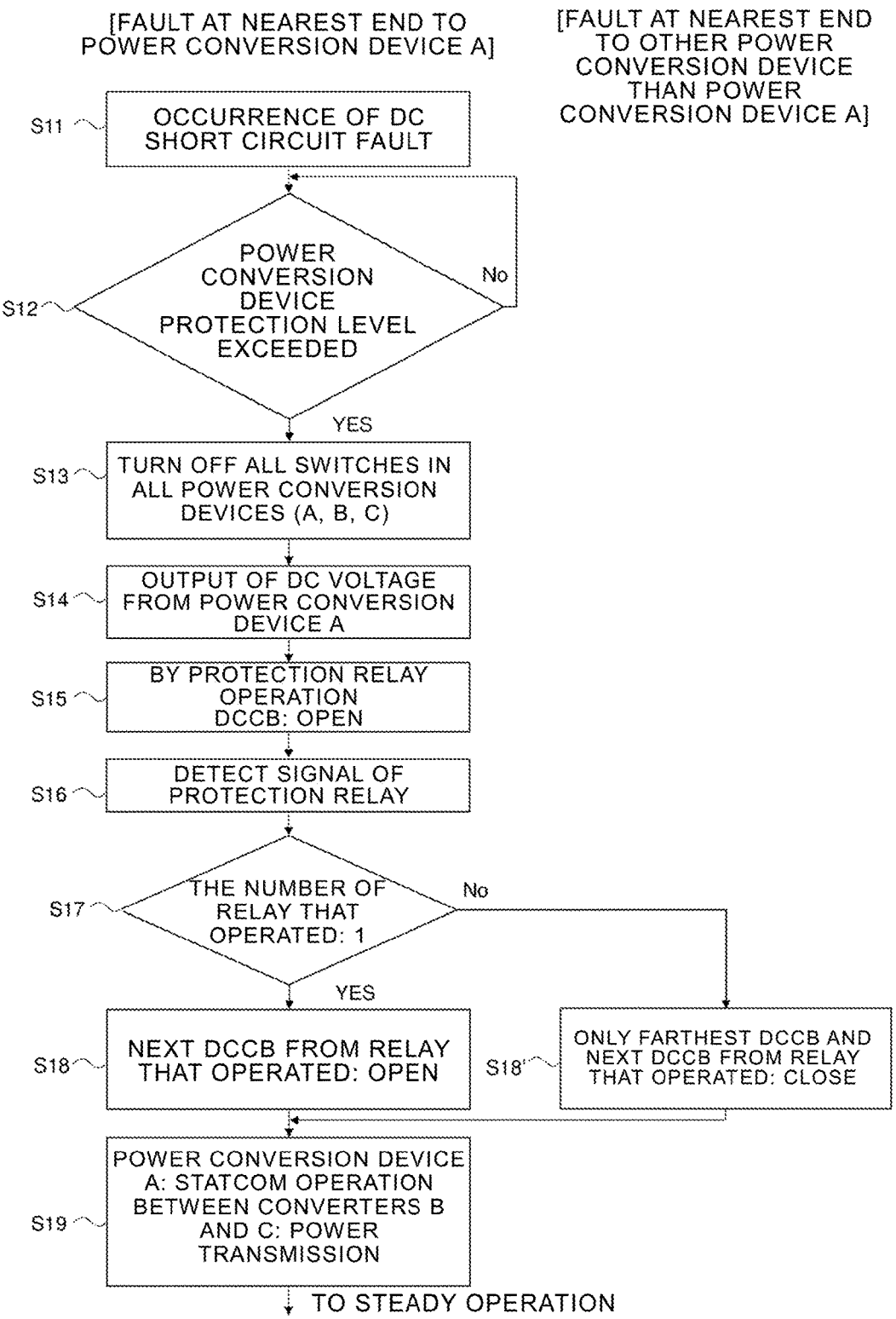
FIG. 16 is a flow chart describing operation of fault point removal using a protection relay and a power conversion device according to embodiment 8 of the present invention.

FIG. 16 is a flow chart describing operation of fault point removal by use of the protection relay and the power conversion device according to embodiment 8 of the present invention.

DC fault removal and power transmission between normal two terminals to be performed when the DC lines 2, 3 are short-circuited in the HVDC system in three-terminal configuration are described with reference to FIG. 15 and FIG. 16.

First, a case where a DC short circuit fault has occurred at a nearest end to the power converter 1A is described. When a DC short circuit fault has occurred (S11), each power converter 1A, 1B, 1C detects that a protection level (e.g., current value), set in advance, of the power conversion device has been exceeded (S12), and turns off all the switching elements in each power conversion device 1A, 1B, 1C (S13). By turning off the switching elements, fault current flowing in each power conversion device 1A, 1B, 1C can be suppressed.

Next, the power converter 1A outputs, to the DC end thereof, voltage that allows a protection relay not shown to perform fault determination and that the power converter 1A can output (S14), whereby the sensor 91A detects the fault and the breaker 92A is opened (S15).

The fault point is between the sensors 91A and 91A', and thus, by the converter 1A outputting voltage to the DC terminal, current flows via the sensor 91A, the breaker 92A, and the fault point. The sensor 91A detects this current and the protection relay operates, whereby only the breaker 92A is opened. However, since the fault point is between the sensors 91A and 91A', power transmission between normal terminals (the power converters 1B, 1C) cannot be performed in this state.

At this time, a signal indicating that the breaker 92A has been opened is provided to the DC short circuit fault point determination unit 200 (S16). Then, if it is determined that the number of the opened breaker is 1 (S17), a signal for opening the breaker 92A' which is next to the opened breaker 92A on the farther side when viewed from the converter is provided (S18).

Through the operations described above, the breakers 92A and 92A' installed in the other side of the fault point on are opened, whereby the fault on the DC lines is removed. That is, since the normal terminals (the power converter 1B, 1C) are not influenced by the fault point, power transmission can be started (S19).

Next, a case where a DC short circuit fault has occurred at a nearest end to the power converter 1B (1C) is described. When a DC short circuit fault has occurred (S11), each power converter 1A, 1B, 1C detects that a protection level (e.g., current value), set in advance, of the power conversion device has been exceeded (S12), and turns off all the switching elements in each power conversion device 1A, 1B, 1C (S13). By turning off the switching elements, fault current flowing in each power conversion device 1A, 1B, 1C can be suppressed.

Next, the power converter 1A outputs, to the DC terminal thereof, voltage that allows a protection relay not shown to perform fault determination and that the power converter 1A can output (S14), whereby the sensor 91A, 91A', 91B' (91A, 91A', 91C') detects the fault and the breaker 92A, 92A', 92B' (92A, 92A', 92C') is opened (S15).

The fault point is between the sensor 91B and 91B' (91C and 91C'), and thus, by the converter 1A outputting voltage to the DC terminal, currents flows via the sensor 91A, 91A', 91B' (91A, 91A', 91C'), the breaker 92A, 92A', 92B' (92A, 92A', 92C'), and the fault point. The sensor 91A, 91A', 91B' (91A, 91A', 91C') detects this current, and the protection relay operates to open the breaker 92A, 92A', 92B' (92A, 92A', 92C'). However, since the fault point is between the sensors 91B and 91B', power transmission between normal terminals (the power converter 1A, 1C(1B)) cannot be performed in this state.

At this time, a signal indicating that the breaker 92A, 92A', 92B' (92A, 92A', 92C') has been opened is provided to the DC short circuit fault point determination unit 200 (S16). Then, if it is determined that the number of the opened breakers is a plural number (S17), a signal is provided that is for opening the breaker 92B' (92C') that is farthest viewed from the converter among the opened breakers, and the breaker 92B (93C) is next thereto on the further side when viewed from the converter, and for closing the other breakers 92A, 92A', 92C, 92C' (92A, 92A', 92B, 92B') (S18').

Through the operations described above, since the breakers 92B and 92B' (92C and 92C') installed in the other side of the fault point on are opened, normal terminals (the power converter 1B, 1C (1B)) are not influenced by the fault point. Thus, power transmission can be started (S19).

Also, the power converter 1A having been disconnected from the DC lines 2, 3 can operate as STATCOM which supplies reactive power to the AC grid 9A (S19).

As a configuration example of a multi-terminal HVDC, a configuration example of three-terminal HVDC system is shown in FIG. 15. However, the number of the DC terminals may be 4 or greater, and the number of the terminals and the connection method of the DC lines are not limited.

In the present embodiment, opening/closing of the breaker is performed through output from one power conversion device and communication to the DC short circuit fault point determination unit. However, a configuration may be employed in which opening/closing of the breaker is performed through outputs from a plurality of power conversion devices without using communication to the DC short circuit fault point determination unit.

Although embodiments of the present invention have been described, the present invention is not limited to the embodiment, and various design modifications can be made. It is noted that, within the scope of the present invention, the above embodiments may be freely combined with each other, or each of the above embodiments may be modified or abbreviated as appropriate.

DESCRIPTION OF THE REFERENCE CHARACTERS 1, 1A, 1B, 1C: power converter
2: positive DC line
3: negative DC line
4U, 4V, 4W: phase arm
5U, 5V, 5W: positive arm
6U, 6V, 6W: negative arm
7U, 7V, 7W: AC connection point
8: transformer
9: AC power grid
10, 20, 30, 40: converter cell
21, 22, 31, 32, 34, 41, 42, 43, 44: switch
21s, 22s, 31s, 32s, 34s, 41s, 42s, 43s, 44s: switching element
21d, 22d, 31d, 32d, 34d, 41d, 42d, 43d, 44d: diode
23, 35, 36, 45, 46: series unit
29, 39, 49: DC capacitor
90: DC short circuit fault
91: sensor
92: DC breaker
93: protection relay
100: control device
110 to 170: voltage command generation unit (110: normalization/calculation unit, 120: DC-AVR/DC-ACR control unit, 130: DC voltage adjustment amount calculation unit, 140: DC voltage command value calculation unit, 150: AC voltage control unit, 160A: positive arm voltage command value calculation unit, 160B: negative arm voltage command value calculation unit, 170A: positive-side each-cell individual control unit, 170B: negative-side each-cell individual control unit)
180A: positive PWM circuit
180B: negative PWM circuit
200: DC short circuit fault point determination unit

The invention claimed is:

1. A power conversion device comprising:
a power converter connected between an AC line having a plurality of phases and a DC line, the power converter for performing power conversion between AC and DC, wherein a positive arm and a negative arm which correspond to each of the plurality of phases are connected in series, one end of the plurality of positive arms are connected to each other and connected to the DC line at a positive side, and one end of the plurality of negative arms are connected to each other and connected to the DC line at a negative side; and
a control device for controlling the power converter, wherein
each of the plurality of positive arms and the plurality of negative arms which correspond to the plurality of phases is comprised of one converter cell or a plurality of converter cells connected in series, each converter cell comprising a series unit in which a plurality of switching elements are connected in series to each other; and a DC capacitor connected in parallel to the series unit,
the control device has a voltage command generator for generating a first voltage command value for each positive arm, and a second voltage command value for each negative arm, and controls each switching element of the converter cell in the positive arm and the negative arm, and
in response to detecting a DC short circuit fault in the DC line, the control device causes a protection relay in the DC line to operate by causing DC voltage to be outputted from a DC terminal of the power converter.

2. The power conversion device according to claim 1, wherein
in response to detecting a DC short circuit fault in the DC line, the control device causes AC voltage similar to that in a steady state to be outputted from an AC terminal of the power converter.

3. The power conversion device according to claim 1, wherein
at least one of the positive arm and the negative arm comprises a converter cell configured to output a negative voltage.

4. The power conversion device according to claim 3, wherein
the converter cell comprises:
two series units connected in parallel; and
a DC capacitor connected in parallel to the series units, the DC capacitor being configured to smooth DC voltage, wherein
one of the series units comprises a plurality of switching elements connected in series, each switching element having a diode connected thereto in anti-parallel, and
the other of the series units comprises a switching element having a diode connected thereto in anti-parallel; and a diode, the switching element and the diode being connected in series.

5. The power conversion device according to claim 3, wherein
the converter cell comprises:
two series units connected in parallel; and
a DC capacitor connected in parallel to the series units, the DC capacitor being configured to smooth DC voltage, and
each series unit comprises a plurality of switching elements connected in series, each switching element having a diode connected thereto in anti-parallel.

6. The power conversion device according to claim 3, wherein
another converter cell of one of the positive arm and the negative arm is configured to output a positive voltage, and
the another converter cell comprises
a series unit comprised a plurality of switching elements connected in series, each switching element having a diode connected thereto in anti-parallel; and
a DC capacitor connected in parallel to the series unit, the DC capacitor being configured to smooth DC voltage.

7. The power conversion device according to claim 1, wherein
at least one of the positive arm and the negative arm is configured to include one or both of: a converter cell configured to output positive voltage and zero voltage; and a converter cell configured to output positive voltage, negative voltage, and zero voltage, and
the converter cell of the other of the positive arm and the negative arm is implemented by a converter cell configured to output positive voltage, negative voltage, and zero voltage.

8. The power conversion device according to claim 1, wherein
in response to detecting a DC short circuit fault, the control device causes DC voltage to be outputted, the DC voltage being not less than voltage necessary to cause current at a level which allows the protection relay to operate, to flow in the DC line, the DC voltage being not greater than voltage that causes current to flow that is not greater than a level of overcurrent at which the power converter stops.

9. The power conversion device according to claim 8, wherein
the control device controls the DC voltage to be outputted, such that difference between a predetermined DC current command value and DC current of the power converter becomes close to zero.

10. The power conversion device according to claim 9, wherein
the control device causes AC voltage to be outputted on the basis of a value of the DC current of the power converter, in addition to the DC voltage.

11. The power conversion device according to claim 8, wherein
the control device controls the DC voltage to be outputted on the basis of a value of the DC current of the power converter.

12. The power conversion device according to claim 1, wherein
in response to the power conversion device to which the control device belongs not being in interconnection with an AC grid, the control device causes DC voltage to be outputted from the DC terminal by use of energy accumulated in the DC capacitor of the converter cell.

13. The power conversion device according to claim 1 being applied to an HVDC system in multi-terminal configuration in which three or more of the power conversion devices have DC terminals thereof connected to each other through the DC line, wherein
in response to detecting a DC short circuit fault between DC terminals, the power converter of each of the three or more of the power conversion devices causes predetermined DC voltage to be outputted from the DC terminal thereof, the predetermined DC voltage allowing protection relays in the DC line to operate.

14. The power conversion device according to claim 13, wherein
in response to detecting the short circuit fault between the DC terminals, the control device causes a fault point thereof to be removed, and then, causes reactive power to be outputted from the power converter.

15. The power conversion device according to claim 14, wherein
in the HVDC system in multi-terminal configuration, in response to detecting a DC short circuit fault between DC terminals, the power converter causes the protection relays in the DC line to operate through the DC terminals thereby to remove the fault point, and then, power transmission is performed between normal terminals which are not influenced by the fault point.

16. The power conversion device according to claim 15, wherein
in response to detecting the short circuit fault between the DC terminals, the control device causes a fault point thereof to be removed, and then, causes reactive power to be outputted from the power converter at a nearest end to the fault point.

17. The power conversion device according to claim 1, wherein
in response to detecting a DC short circuit fault in the DC line, the control device causes the protection relay in the DC line to operate by causing DC voltage having the same polarity as that in a steady case to be outputted from the DC terminal of the power converter.

18. The power conversion device according to claim 1, wherein
a value of the DC voltage to be outputted from the DC terminal of the power converter is a predetermined value which is not less than voltage necessary to cause current at such a level that the protection relay operates, to flow in the DC line, and which is not greater than voltage that causes current not greater than overcurrent at which the power converter stops, to flow.

19. The power conversion device according to claim 1, wherein after causing voltage for suppressing fault current occurring due to DC short circuit in the DC line to be outputted from the DC terminal, the control device causes the protection relay in the DC line to operate by causing the DC voltage to be outputted from the DC terminal of the power converter.

20. A power conversion system comprising:
a plurality of power conversion devices each having: a power converter for performing power conversion from AC to DC or from DC to AC; and a control device for controlling the power converter, the power conversion devices having DC terminals thereof connected to each other through a DC line;
a current sensor for detecting current on the DC line;
a breaker for opening/closing the DC line; and
a protection relay for controlling opening/closing of the breaker on the basis of information of the current detected by the current sensor, wherein
in response to detecting a DC short circuit fault on the DC line, each control device suppresses output of DC voltage from a corresponding one of the power converters and causes predetermined DC voltage to be outputted from the DC terminal of a corresponding one of the power conversion devices, and
on the basis of the information of the current detected by the current sensor, the protection relay causes the breaker to open.

21. A method for controlling a power conversion system, the power conversion system including:
a plurality of power conversion devices each having: a power converter for performing power conversion from AC to DC or from DC to AC; and a control device for controlling the power converter, the power conversion devices having DC terminals thereof connected to each other through a DC line;
a current sensor for detecting current on the DC line;
a breaker for opening/closing the DC line; and
a protection relay for controlling opening/closing of the breaker on the basis of information of the current detected by the current sensor,
the method comprising:
a fault detection step, performed by each control device, of detecting a DC short circuit fault on the DC line;
an output suppressing step, performed by each control device, of suppressing output of DC voltage from a corresponding one of the plurality of power conversion devices;
an output step, performed by the corresponding one of the plurality of power conversion devices, of outputting predetermined DC voltage from a DC terminal of the power conversion device; and
an opening step, performed by the protection relay, of causing the breaker to open on the basis of the information of the current detected by the current sensor.

22. A power conversion device comprising:
a power converter for performing power conversion between AC and DC, the power converter including a plurality of converter cells connected in series between a positive DC terminal and a negative DC terminal, each converter cell including switching elements and a DC capacitor; and
a control device for controlling the switching elements of the converter cells, wherein
in response to detecting a DC short circuit fault, the control device controls the switching elements of the converter cells to cause DC voltage to be outputted from the DC terminal of the power converter, the DC voltage allowing a protection relay in a DC line connected to the DC terminal to operate.

* * * * *